| United States Patent [19] | [11] Patent Number: 4,769,259 |
|---|---|
| Ueno | [45] Date of Patent: Sep. 6, 1988 |

[54] METHOD FOR PREVENTING FOGGING OF SURFACES

[75] Inventor: Minoru Ueno, Kanagawa, Japan

[73] Assignee: Nogawa Chemical Co., Ltd., Japan

[21] Appl. No.: 19,751

[22] Filed: Feb. 27, 1987

[30] Foreign Application Priority Data

Oct. 13, 1986 [JP] Japan ................. 61-242350

[51] Int. Cl.$^4$ ............................................. B05D 5/06
[52] U.S. Cl. .................... 427/164; 427/165; 427/340; 427/339; 427/341
[58] Field of Search ............ 427/164, 339, 341, 340, 427/165

[56] References Cited

U.S. PATENT DOCUMENTS

| 3,736,172 | 5/1973 | Delano et al. | 427/164 |
|---|---|---|---|
| 3,933,407 | 1/1976 | Tu et al. | 427/164 |
| 3,935,367 | 1/1976 | Merrill et al. | 427/164 |

FOREIGN PATENT DOCUMENTS 0137801 8/1983 Japan .................. 427/164

*Primary Examiner*—Janyce A. Bell
*Attorney, Agent, or Firm*—Steele, Gould & Fried

[57] ABSTRACT

The present invention relates to a method for preventing fogging or clouding of surfaces comprising glass, high molecular weight substance, and the like. The method comprises the steps of: (1) applying a dispersion liquid wherein a high molecular substance having a hydroxyl group is added to the surface to be treated (2) causing the substance on the surface to react while adding cyanuric chloride, (3) hydrolyzing the resultant mixture with a base, (4) neutralizing the treated surface, (5) rinsing and drying the above neutralized surface, (6) reacting a nonionic surface active agent having a fluorine group or a silicone group with a $NH_2$ group or H group to react on the surface, (7) hydrolyzing the resultant surface and then, (8) neutralizing the surface with an acid.

10 Claims, No Drawings

METHOD FOR PREVENTING FOGGING OF SURFACES

BACKGROUND OF THE INVENTION

1. Field of the Invention

The present invention relates to a method for preventing fogging or clouding of transparent reflective surfaces by steam and the like. More particularly, the invention relates to a method for preventing fogging of (1) medical masks and radiation protective masks, (2) various helmets and visors for fireman, motorcyclists, spacemen and the like, (3) goggles for swimming, diving and the like, (4) eye-glasses for vision-correction, (5) mirrors for bathroom and toilets, (6) window glasses for motor vehicles, ships, aeroplanes, and the like, (7) medical endoscopes, (8) camera lens, filter lens, (9) observational windows which are installed to various apparatuses, and

(10) cover glasses for various instruments.

2. Description of the Prior Art

It is known to prevent fogging of glass and organic high molecular substances such as cellulose polymers, polycarbonates, polymethylmethacrylates and the like by their treatment with compositions comprising (1) hydrophobic and water repellent materials, including silicone resin, fluoro-resin, and the like, (2) hydrophilic materials including surface active agents, and the like, and (3) surface active agents added to a substance for hydrolyzing the polymer.

The above methods have been performed, but there is a problem in durability after the anti-clouding or anti-fogging treatment in all cases.

In the prior art methods for preventing fogging there is little continuity in the effect of the anti-fogging treatment so that the effect is to reduce in half the several uses.

SUMMARY OF THE INVENTION

According to the present invention there is provided a method for preventing fogging of surfaces such as glass, organic high molecular weight substances, and the like, by the steps comprising (1) Applying to said surface a dispersion liquid containing a high molecular weight substance having an available hydroxyl group after a hydrolysis reaction, for example cellulose. Preferably, the dispersion liquid is an aqueous solution. The dispersion liquid may also be attached to the surface to be treated by means of an adhesive.

(2) Reacting the resulting surface with cyanuric chloride.

(3) Hydrolyzing the reacted surface with a base.

(4) Neutralizing the resulting surface with an acid.

(5) Water rinsing and drying the neutralized surface.

(6) Reacting the neutralized surface with a nonionic surface active agent having a fluorine group or silicone group with a $NH_2$ group or OH at the end of the molecule.

(7) Hydrolyzing the reacted surface with a base.

(8) Neutralizing the above hydrolyzed surface with an acid solution.

(9) Drying the above neutralized surface after water-rinsing.

By performing the above operations successively, it is possible that an anti-fogging effect is given to the surfaces to be treated.

Among the organic high molecular weight substances which are capable of being treated according to the invention, there are included cellulose-polymer, polycarbonate, polymethylmethacrylate, and the like:

In the present invention, the hydroxy group of the high molecular weight substance (for example, cellulose) which is produced after hydrolysis, reacts with cyanuric chloride chemically on the surfaces to be treated. The chlorine group in cyanuric chloride and the fluorine of the surface active agent or the silicone of the surface active agent are believed to react according to the following chemical reaction:

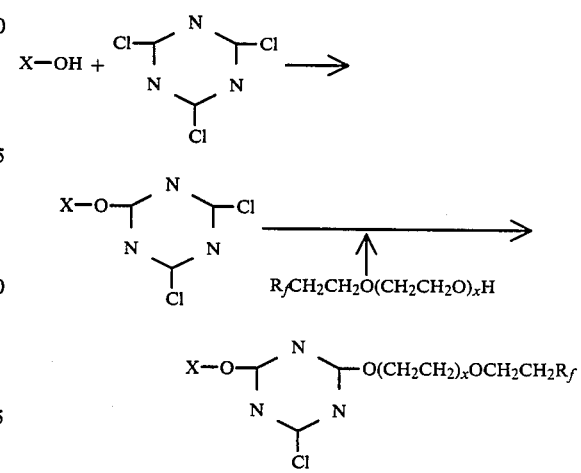

wherein Y is H or $NH_2$, X-OH indicates a high molecular weight substance having a hydroxyl group, for example, a cellulose, $R_f$ is an alkyl group of 1–10 carbon atoms having a silicone or fluoro group, and x is an integer from 1 to 20, preferably 2–10.

Accordingly, it is an object of the invention to provide a method for performing the anti-fogging treatment of the present invention which is different from the prior art, and it is possible that the anti-fogging treatment will have continuity and excellent durability in performance.

The following non-limiting example illustrates the method of the present invention.

EXAMPLE

A dispersion liquid is prepared in which 20 g of cellulose is dispersed in a mixture composed of 30 ml of dioxane and 70 ml of distilled water. The liquid is applied to a glass surface. The surface is cooled to above 0° C., and the reaction is continued for fifteen minutes while adding dropwise 1.0 g of cyanuric chloride.

The reacted substrate is then hydrolyzed by the dropwise addition of 20 ml of 5% potassium hydroxide solution over a ten minute period. The hydrolyzed substrate is neutralized with 3.5% hydrochloride acid. The neutralized substrate is then rinsed with water and dried.

The treated substrate is then reacted with a water dispersion of a fluorine surface active agent having the formula: $R_fCH_2CH_2O(CH_2CH_2O)_xH$, wherein $R_f$ is $CF_3$ and X is 2. Thereafter the reacted substrate is hydrolyzed with 20 ml of a 5% potassium hydroxide solution over a ten minute period, neutralized with 3.5% hydrochloric acid and then washed.

Other suitable nonionic substrates which may be used in the invention are disclosed in Kirk and Othmer, *Encyclopedia of Chemical Technology*, Vol. 19, pages 531 to 554, entitled "Nonionic Surfactants", which is incorporated herein by reference.

EFFECT OF THE INVENTION

A fogged state is compared between the treated substrate of the example with an untreated substance by applying steam under the same condition as the treated substance of the example. The treated substrate remains unfogged.

In further comparison, a substance which is treated by a commercial silicone anti-fogging agent loses a substantial portion of its anti-fogging effect after several uses while the treated substrate of the invention shows a semipermanent existence.

What is claimed is:

1. A method for preventing fogging of surfaces composed of glass or organic high molecular weight substances, which comprise the steps of
    (A) applying a dispersion liquid containing a cellulose which possesses an available hydroxyl group after a hydrolysis reaction,
    (B) reacting the resulting surface with cyanuric chloride,
    (C) hydrolyzing the reacted surface with a base,
    (D) neutralizing the alkali treated surface with an inorganic acid,
    (E) reacting said neutralized surface with a nonionic surface active agent having the formula:

$$R_f CH_2CH_2O(CH_2CH_2O)_xY$$

wherein Y is hydrogen or amino, $R_f$ is an alkyl group of 1 to 10 carbon atoms having a fluoro or silicone group, and x is 1 to 20,
    (F) hydrolyzing the reacted surface with a base, and then
    (G) neutralizing said hydrolyzed surface with an inorganic acid.

2. The method of claim 1 wherein said surface is transparent.
3. The method of claim 1 wherein said polymer is cellulose.
4. The method of claim 1 wherein said dispersion liquid is a dioxane-water solution.
5. The method of claim 1 wherein said dispersion liquid is applied to said surface with an adhesive.
6. The method of claim 1 wherein the surface is washed and dried after the neutralizing step.
7. The method of claim 1 wherein said base is potassium hydroxide.
8. The method of claim 1 wherein said acid is hydrochloric acid.
9. The method of claim 1 wherein $R_f$ is a fluorinated alkyl group of 2 to 10 carbon atoms.
10. The method of claim 1 wherein $R_f$ is $CF_3$, Y is hydrogen and x is 2.

* * * * *